June 9, 1936.    J. G. W. MULDER ET AL    2,043,515
RECTIFYING CIRCUIT ARRANGEMENT Filed Sept. 7, 1934

Inventors:-
J. G. W. Mulder
and D. M. Duinker
by  ~~~~~  Atty.

Patented June 9, 1936

2,043,515

UNITED STATES PATENT OFFICE 2,043,515

RECTIFYING CIRCUIT ARRANGEMENT

Johannes Gijsbertus Wilhelm Mulder and Daniel Marie Duinker, Eindhoven, Netherlands, assignors to N. V. Philips' Gloeilampenfabrieken, Eindhoven, Netherlands Application September 7, 1934, Serial No. 743,138 In Germany September 13, 1933

4 Claims. (Cl. 175—363)

The present invention relates to a rectifier installation and more particularly to a novel arrangement of same which considerably increases the reliability of such an installation when used for high voltage rectification.

For the rectification of alternating current various rectifier devices are used; however, where comparatively large currents at comparatively high voltages are to be rectified, gas-filled rectifier tubes have been found the most suitable. The safety of operation of such rectifier tubes is determined by the maximum inverse voltage, i. e. the maximum voltage in that half cycle or phase of the alternating current which the rectifier is to block, which the rectifier tube can stand without the occurrence of back discharges. It has been found that with increasing values of either the voltage or the current the possibility of back discharge occurring in the rectifier tube increases and that under various conditions it is desirable to operate two or more rectifier tubes in series arrangement.

For instance, while rectifier tubes which are adapted to handle at 500 volts currents up to about 10 amps. are available, if a larger current is required at this voltage, or the same current at a higher voltage, it is necessary for satisfactory operation to employ two rectifier tubes in series arrangement. Similarly, if at 200 volts the current to be rectified is more than 50 amps. or if 50 amps. have to be rectified at a higher voltage, two rectifier tubes are to be used in series arrangement, so as to prevent the occurrence of back discharges.

However, when connecting two gas-filled rectifier tubes in series, difficulties arise on account of unequal voltage distribution between the two tubes during the blocking phase of alternating current with the result that a sufficiently large proportion of the inverse voltage may be taken up by one of the tubes to cause a back discharge in same.

Experience has shown that the manner in which the inverse voltage divides between the series-connected rectifying tubes depends upon rather accidental circumstances, for instance upon the capacity existing between the electrodes of the individual tubes; or again if the envelope of one of the tubes is moist, the leakage current across this envelope may short-circuit this tube so that the other tube receives the full inverse voltage. As a result a back discharge occurs in the latter tube causing the full inverse voltage to be applied to the first tube, whereby this tube necessarily also breaks down.

In known practice arrangements are used by which the above mentioned equal voltage distribution is realized by connecting a voltage dividing device in parallel with the series connected rectifying tubes, with the object of swamping the accidental differences in the distribution of the capacitative and leakage resistances occurring in parallel with the individual discharge tubes. So this voltage divider may consist for instance of a series connection of any kind of impedances, that ensures an equal voltage distribution between its succeeding junction points.

This solution has the drawback of a more or less complicated circuit arrangement, the components of which must usually be designed for rather high breakdown voltages, and may tend to decrease the reliability of the rectifier as a whole.

Another solution of the problem (here specially explained for the case of two rectifier tubes) consists in the application of a potential connection between the junction point of the series-connected rectifier tubes and the mid-point of the load, for instance, of a storage battery.

However, such an arrangement has the drawback, that a third connection to the load is involved, which may prove to be an expensive complication in the case of more extensive battery installations.

Besides a specially designed transformer is required which enables each half of the rectifying circuit to be connected to its proper half of the secondary voltage.

According to the invention these drawbacks are avoided by the skillful use of a typical phenomenon occurring in glow discharges. A voltage current characteristic of such a discharge, including current values from the so called striking point to the point at which the glow discharge develops into an arc, will show a typical voltage to current relation, which may be characterized as follows:

With increasing current the voltage across the discharge will drop very quickly to a practically constant value, corresponding to the "normal cathode drop". In the same time, the surface of the negative electrode is gradually covered with the negative glow, the specific current load of the surface remaining at a constant value until the whole surface of the cathode is covered therewith. With further increase of the discharge current, the specific current load of the electrode surface must necessarily increase and with a corresponding, gradual rise of the discharge voltage, the "anomalous cathode drop" manifests itself, until the voltage has been reached, at which the arc develops.

In a rectifier tube described hereinbefore, the corresponding voltage will give rise to the occurrence of a back-discharge. Correspondingly a back-discharge in series connected discharge tubes can be prevented by complying to the following conditions:

(1) The "blocking voltage" may never exceed the sum of the back discharge voltages of the tubes concerned;

(2) The glow discharge characteristics of the individual tubes should have sufficient conformity to enable each of them to be worked within the glow discharge region of the above mentioned discharge curve throughout the blocking phase of the rectifier.

When these conditions are complied with, it will be possible to operate a number of gas-filled rectifier tubes in series without the use of the auxiliary voltage dividers described above, practically eliminating the disturbing effects of accidental differences in the ohmic and capacitative resistances, occurring in parallel with the individual discharge tubes.

By a proper choice of the gas pressure, electrode distance, shape and area of the electrodes and so on, it is possible to obtain tubes satisfying the above described conditions, as far as the tubes themselves are concerned.

The invention will be more clearly understood by reference to the accompanying drawing.

Figures 1, 2:
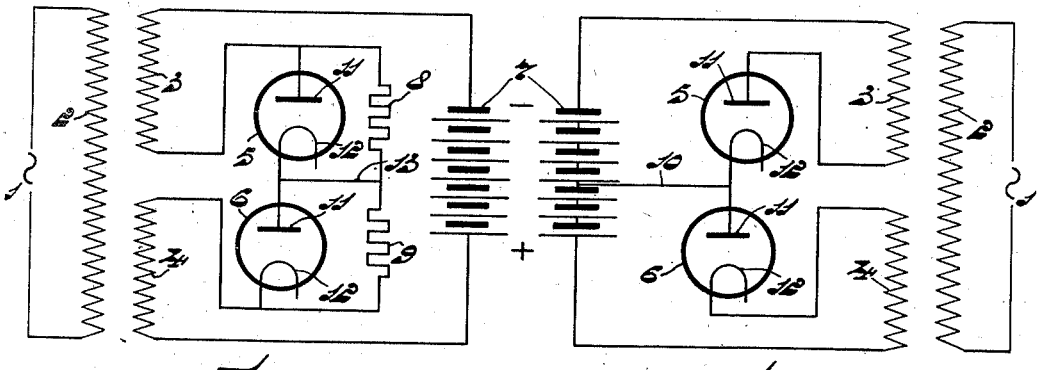
Figure 1 is a schematic diagram of a rectifying circuit for battery charging according to present practice, which has been protected against back discharges by the addition of a voltage divider of ohmic nature.
Fig. 2 is a schematic diagram similar to Fig. 1 in which protection against back discharges is obtained by the use of a potential connection to the midpoint of the battery.

In Figure 1 the alternating current is supplied by an alternating current source 1, the current flowing through the primary winding 2 of a transformer having two secondary windings 3 and 4.

The gas-filled rectifier tubes 5 and 6, each having an anode 11 and a cathode 12, are connected in series respectively with the secondary winding 3 and 4 of the transformer. The load 7, represented by a battery requires, for example, a charging voltage of over 220 volts and a charging current in excess of 50 amps. The charging circuit can be traced as going from one end of battery 7 through winding 4, rectifier 6, rectifier 5 and winding 3 back to the other end of battery 7.

When the voltage is to be evenly divided by impedances, these are represented in Fig. 1 by the resistances 8 and 9 across the rectifier tubes 5 and 6 and their junction point 13, whereas the alternative solution consisting in a potential connection between the midpoints of the tubes and the load, is shown in Fig. 2 at 10.

Figure 3:
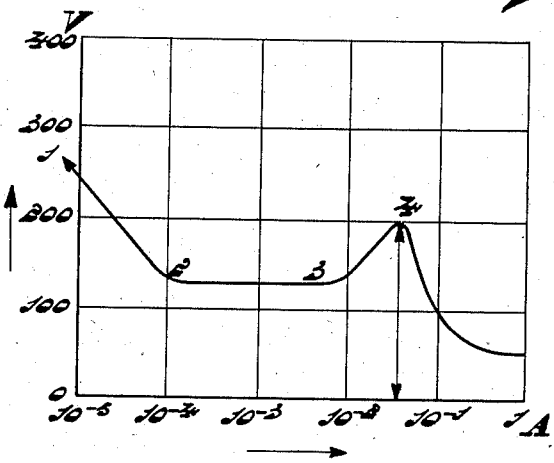
Figure 3 shows the voltage-current characteristic of a typical glow discharge.

In Figure 3 the striking point of the glow discharge lies in the direction of the arrow at 1. At 2 the "normal cathode drop" occurs, the voltage remaining constant until the total surface of the cathode is covered with glow at 3. Beyond the point 3 the increase in the specific current load of the cathode gives rise to the "anomalous cathode drop" until at 4 the glow discharge rather suddenly develops into an arc.

Figure 4:
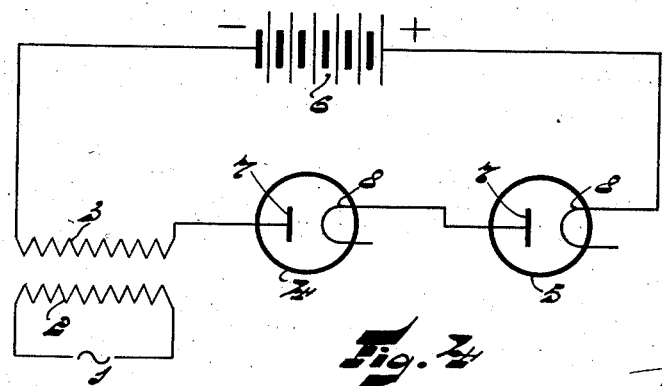
Figure 4 represents by way of example, one embodiment of the invention.

As a result of the use of properly chosen tubes, conforming to the above mentioned conditions, the circuit of Fig. 4 needs no auxiliary voltage divider at all. A transformer of conventional design, the primary winding 2 of which is supplied with alternating current from the alternating current source 1, supplies current to a load 6, represented by a battery, through a secondary winding 3, to which the rectifier tubes 4, 5, each having an anode 7 and a cathode 8, are most simply series connected.

The rectifier tubes 4 and 5 of Figure 4 contain a gas- or vapour-filling or a mixture thereof, and are so dimensioned with regard to electrode distances and gas-pressure as to show a glow discharge in the blocking phase, in compliance with the conditions, on the realization of which the even distribution of the inverse voltage over the individual tubes depends, thus avoiding the occurrence of a back discharge.

While we have partially described our invention in connection with two rectifiers connected in series, it should be well understood that a series connection of more than two tubes can be executed in a similar manner and with similar satisfactory results.

Also while we have described our invention in connection with specific embodiments and in a specific application, we do not wish to be limited thereto, but desire the appended claims to be construed as broadly as permissible in view of the prior art.

What we claim is:

1. A rectifier installation comprising a plurality of incandescent cathode gas-filled rectifier tubes, said tubes being connected in series and being of such character as to permit in the blocking phase of the alternating current the passage of a current having a value which is sufficient to establish a glow discharge in the tube, but insufficient to establish an arc discharge.

2. A rectifier installation comprising a plurality of rectifier tubes having incandescent cathodes and a gaseous filling, said tubes being connected in series and adapted to pass in the rectifying phase of the alternating current a current of more than 10 amperes at a voltage of more than 200 volts, and to permit in the blocking phase of the alternating current the passage of a current of at least several milliamperes.

3. A rectifier installation comprising a plurality of incandescent cathode gas-filled rectifier tubes, said tubes being connected in series and being of such character as to permit in the blocking phase of the alternating current the passage of a current having a value which is sufficient to establish a glow discharge in the tubes, but insufficient to establish an arc discharge, the voltage to current relation of the glow discharge in the blocking phase of the alternating current for the individual tubes practically being the same.

4. A rectifying installation comprising a plurality of series-connected rectifier tubes having incandescible cathodes and a gaseous filling, each of said tubes being of such a character as to pass in the blocking phase of the alternating current an inverse current which is at least as large as the current at which the normal cathode drop occurs and which is less than the current at which an arc discharge develops.

JOHANNES GIJSBERTUS
WILHELM MULDER.
DANIEL MARIE DUINKER.